No. 616,858. Patented Dec. 27, 1898.
F. H. RICHARDS.
WEIGHING MACHINE.
(Application filed Feb. 11, 1898.)

(No Model.) 7 Sheets—Sheet 1.

*Fig. 1.*

Witnesses:
G. B. Rowley.
Fred. J. Dole.

Inventor:
F. H. Richards.

No. 616,858. Patented Dec. 27, 1898.
F. H. RICHARDS.
WEIGHING MACHINE.
(Application filed Feb. 11, 1898.)

(No Model.) 7 Sheets—Sheet 2.

Witnesses:
G. B. Rowley.
Fred. J. Dole.

Inventor:
F. H. Richards.

No. 616,858. Patented Dec. 27, 1898.
F. H. RICHARDS.
WEIGHING MACHINE.
(Application filed Feb. 11, 1898.)

(No Model.) 7 Sheets—Sheet 3.

Fig. 4.

Witnesses:
G. B. Rowley.
Fred. J. Dole.

Inventor:
F. H. Richards.

No. 616,858. Patented Dec. 27, 1898.
F. H. RICHARDS.
WEIGHING MACHINE.
(Application filed Feb. 11, 1898.)
(No Model.) 7 Sheets—Sheet 4.

Witnesses:
G. B. Rowley.
Fred. J. Dole.

Inventor:
F. H. Richards.

No. 616,858. Patented Dec. 27, 1898.
F. H. RICHARDS.
WEIGHING MACHINE.
(Application filed Feb. 11, 1898.)

(No Model.) 7 Sheets—Sheet 5.

Witnesses:
G. B. Rowley.
Fred. J. Dole.

Inventor:
F. H. Richards.

No. 616,858. Patented Dec. 27, 1898.
F. H. RICHARDS.
WEIGHING MACHINE.
(Application filed Feb. 11, 1898.)
(No Model.) 7 Sheets—Sheet 7.

Witnesses:
G. B. Rowley
Fred. J. Dole.

Inventor:
F H Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 616,858, dated December 27, 1898.

Application filed February 11, 1898. Serial No. 669,880. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines; and the object of the invention is to provide an improved machine of this character involving certain novel features, among which may be mentioned means whereby dust, dirt, &c., are excluded from the beam-bearings, thereby to prevent the same from being clogged, means for effecting a variation in speed of a force-feeder employed to supply the weighing mechanism with material, thereby correspondingly varying the volume of the supply-stream, and means for tripping a latch governing the discharge, and the machine is adapted for weighing various kinds of material, but more especially those of a slow-flowing nature.

In the drawings accompanying and forming part of this specification.

Similar characters designate like parts in all the figures of the drawings.

The framework for supporting the different parts of the machine consists, preferably, of the chambered or hollow base 2 and the column or upright 3 thereon, the latter serving to sustain the supply apparatus, and the beam is mounted in the base, by reason of which its bearings are inaccessible to dust, dirt, &c.

Figure 3:
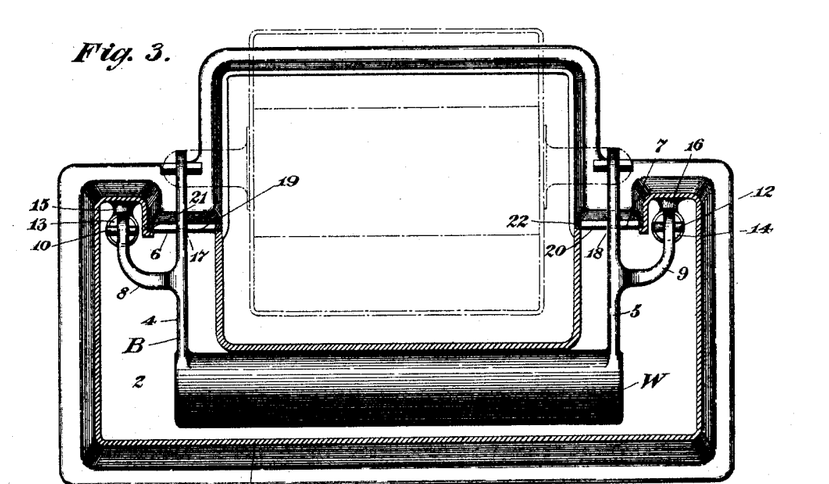
Fig. 3 is a sectional plan view, the section being taken in the line $y\ y$, Fig. 1.

The weighing mechanism consists of a load-receiver, as G, and a supporting scale-beam therefor, as B, consisting, preferably, of a pair of longitudinal arms, as 4 and 5, respectively, extending through the openings 6 and 7 in the base, and the substantially cylindrical counterweight W, joining said arms. (See Fig. 3.) The beam-arms 4 and 5 are provided with lateral offsets 8 and 9, respectively, carrying knife-edges 10 and 12, resting upon the V-shaped bearings 13 and 14, respectively, on the projections 15 and 16 on the interior front side of the base. The arms 4 and 5 of the beam extend through slots, as 17 and 18, respectively, in the flexible diaphragms 19 and 20, which cover the openings 6 and 7, said diaphragms being held in place by the rectangular frames 21 and 22, respectively. The two diaphragms are preferably vertically disposed, and the axis of the beam, as shown in Fig. 3, is substantially in line with the place at which the beam-arms extend through the slots in said diaphragm, so as to subject the latter to the least possible amount of deflection on the oscillation of the scale-beam during the operation of the weighing mechanism.

The load-receiver G is provided near its lower end with the usual notched plates, as 25, resting upon knife-edges 26 at the poising or extended ends of the beam-arms 4 and 5, respectively, and is connected with the framing by the longitudinal guide-link 27, which limits the oscillation of said load-receiver. The load-receiver is provided with the usual closer L, constituting in the present case the load-discharger of the weighing mechanism and pivoted thereto, as at 28, and provided with counterweighted plates, as 29, which shut the closer on the discharge of the load.

The load-discharge-controlling means includes a latch, as L', pivoted at 30 upon the load-receiver, and the arm 31 of which is adapted to engage the arm 32 of the rocker R, carried by the rock-shaft 33 upon the upper side of the load-receiver, the arm 34 of said rocker being pivoted to the longitudinal rod 35, which is likewise jointed to the closer, and said shaft carries at its opposite end the rock-arm 34', connected by the rod 35' with the closer, and the rods 35 and 35' move in parallelism as the closer opens and shuts.

The supply apparatus includes in its construction a supply chute or hopper H and a force-feeder, as F, mounted upon the auxiliary frame F', secured to the column 3, and the force-feeder is driven at different speeds, it being operated at its high speed at the commencement of operation, so as to supply a stream of large volume from the hopper H to the load-receiver G, and being driven at its low speed to convey a drip or reduced stream into the load-receiver to complete the load.

Figure 4:
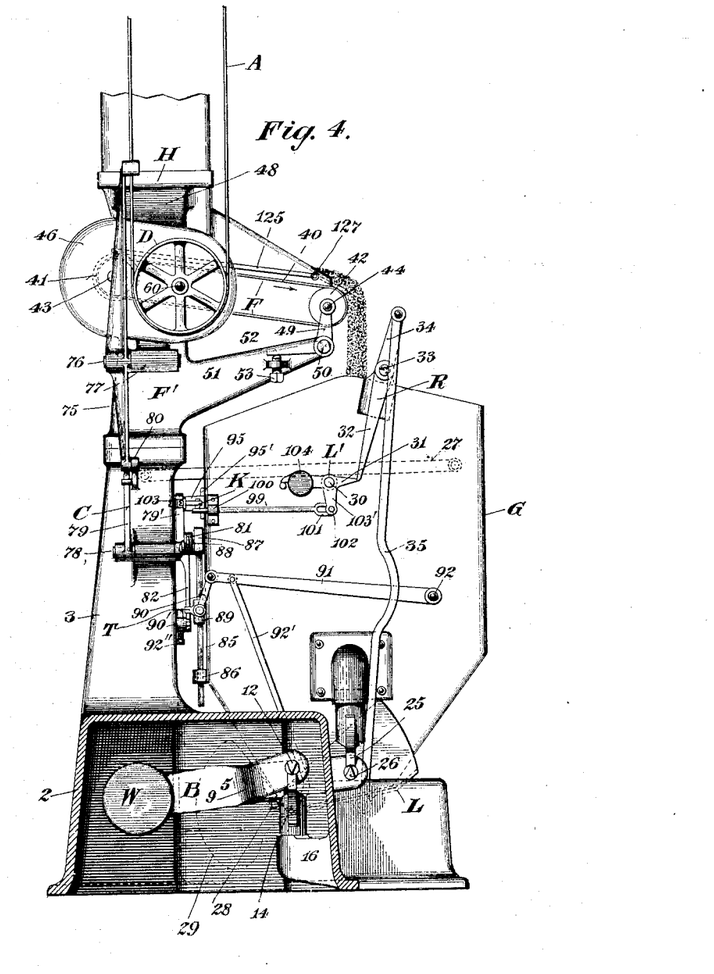
Fig. 4 is a side elevation as seen from the right in Fig. 1, the base being in cross-section.
Figure 5:
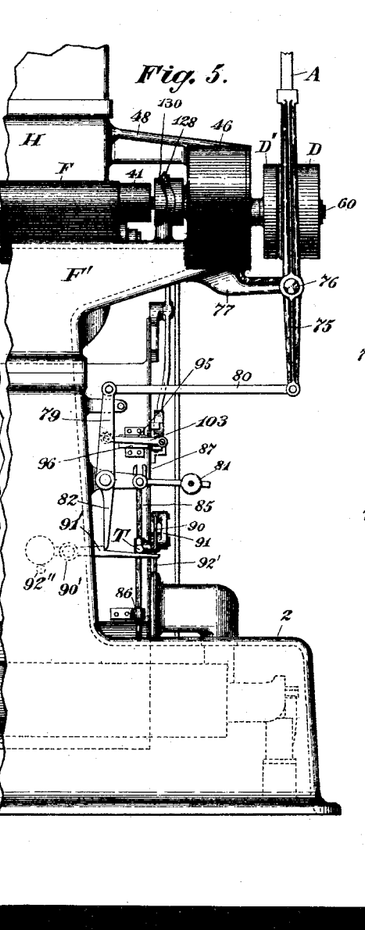
Fig. 5 is a rear elevation of the right half of the machine, the parts being shown in the positions they occupy during the poising period.

The force-feeder F consists, preferably, of an endless band or apron 40, passed around the drums or rolls 41 and 42, fixed to shafts 43 and 44, respectively, the direction of motion of the upper or working run of the endless belt being indicated by the arrow in Fig. 4. The shaft 43 is supported by the casings 45 and 46, respectively, secured to the arms 47 and 48, extending oppositely from the supply-hopper H, while the shaft 44 is supported by arms, as 49, fixed to the ends of the rock-shaft 50, mounted upon the brackets 51, extending from opposite sides of the auxiliary frame F', said shaft 50 carrying a second pair of rock-arms, as 52, the free ends of which rest upon the adjusting-screws 53 on the brackets 51, and by tightening the said screws the tension of the feed-belt can be regulated, as will be clearly apparent.

Figures 11, 12:
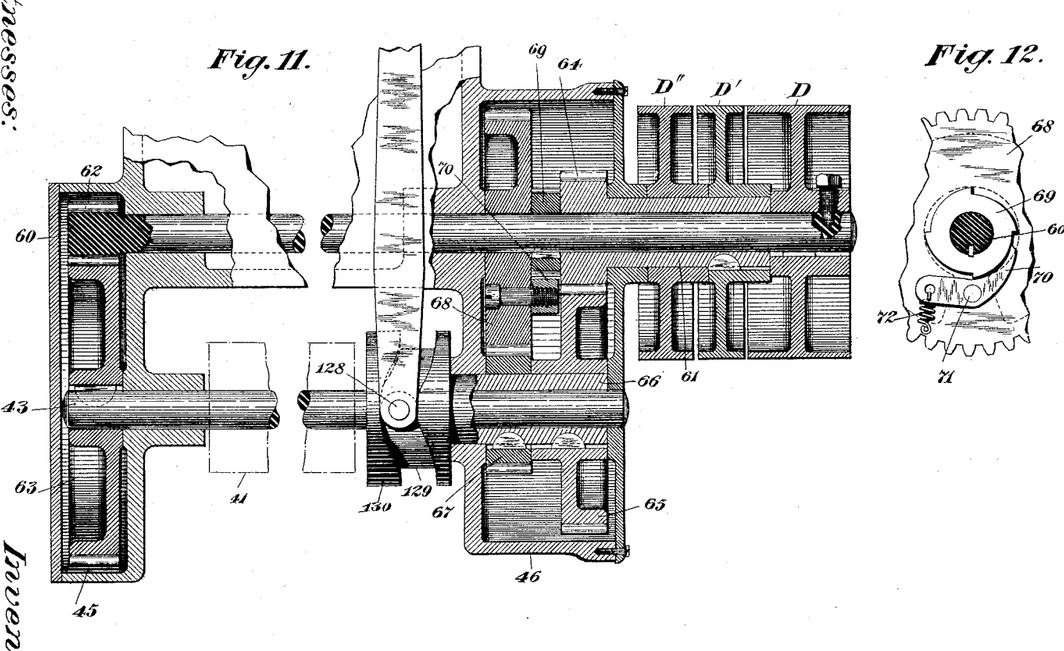
Fig. 11 is an enlarged sectional detail view of the driving mechanism for a feeder.
Fig. 12 is a detail view of a part of said mechanism.

The driving mechanism for the feeder F includes in its construction primary and secondary shafts and a series of drivers, as D and D', which may be pulleys, although other devices might be employed, carried upon the primary shaft 60, the shaft 43, hereinbefore described as carrying the drum 41, constituting the secondary shaft. The pulley D is directly secured to the shaft 60 and when operated serves through intermediate gearing for driving the feeder F at its high speed, while the pulley D' is fixed to the longitudinal sleeve 61, loose on the shaft 60 and connected by gearing with the shaft 43 of such ratio that when the pulley D' is operated the feeder will be driven at its low speed. A third pulley is shown at D'', loose upon the sleeve 61 and constituting an idler and to which the driving-belt is shipped when the motion of the feeder F is to be stopped. The shaft 60 terminates in a pinion 62, meshing with the larger gear 63, fixed to the outer end of the secondary shaft 43, and both gears being mounted in the casing 45, while the sleeve 61 terminates in a pinion 64, meshing with the larger gear 65, fixed to the sleeve 66, loose on the shaft 43. A second pinion is shown at 67, it being fixed to the sleeve 66 and meshing with the larger gear 68, loose on the primary shaft 60 and carrying a device for operating a member fixed to the primary shaft 60, and the proportion of the several gears 64 and 65 and 67 and 68 is such that when the pulley D' is operated the feeder will be operated through said gears at its low speed. The shaft 60 has keyed thereon the ratchet 69, with which the pawl 70 coöperates, said pawl being pivoted, as at 71, to the face of the gear 68 and held in engagement with the teeth of the ratchet by the spring 72, connected, respectively, with said pawl and with the gear 68. (See Fig. 12.)

At the commencement of operation a driving-belt, as A, connected with a motor (not shown) will be upon the pulley D, so that the upper run of the force-feeder F will be driven at its high speed, through the shaft 60, gear 62, gear 63, and shaft 43, to convey from the hopper H into the load-receiver G a comparatively large volume of material, and such motion will continue until the load is nearly completed, at which time the driving-belt will be shifted to the pulley D', so as to drive the said feeder at its low speed through the sleeve 61, gear 64, gear 65, sleeve 66, gear 67, gear 68, pawl 70, ratchet 69, shaft 60, gear 62, gear 63, and shaft 43, whereby a reduced supply of material is conducted into the load-receiver to complete the load. On the completion of the load the driving-belt A is shipped to the idle-pulley D'' to stop the supply-feeder.

The shipper for the belt A is designated by 75, and it consists of a lever pivoted near its middle, as at 76, to an arm 77 on the framework and connected with the actuator, as C.

The actuator C consists, preferably, of a lever fixed to the rock-shaft 78, mounted on the column 3 and carrying a crank-arm 79, to which the link 80 is pivoted, said link being likewise attached at its opposite end to the belt-shipping lever 75, which is furnished with the usual belt-engaging fingers. The actuator C carries at its outer end a weight 81 and is provided with the arm 82, adapted at a predetermined point to be engaged by a suitable detent, which serves to maintain the driving-belt on the intermediate pulley D', and when said detent is tripped the actuator is released and its weight 81 falls, thereby to ship the belt A from the pulley D' to the idle-pulley D''.

The operation of the belt-shipper actuator C is controlled from the weighing mechanism, by reason of which the successive shipments of the belt A are assured at proper points in the operation of the machine.

Figure 1:
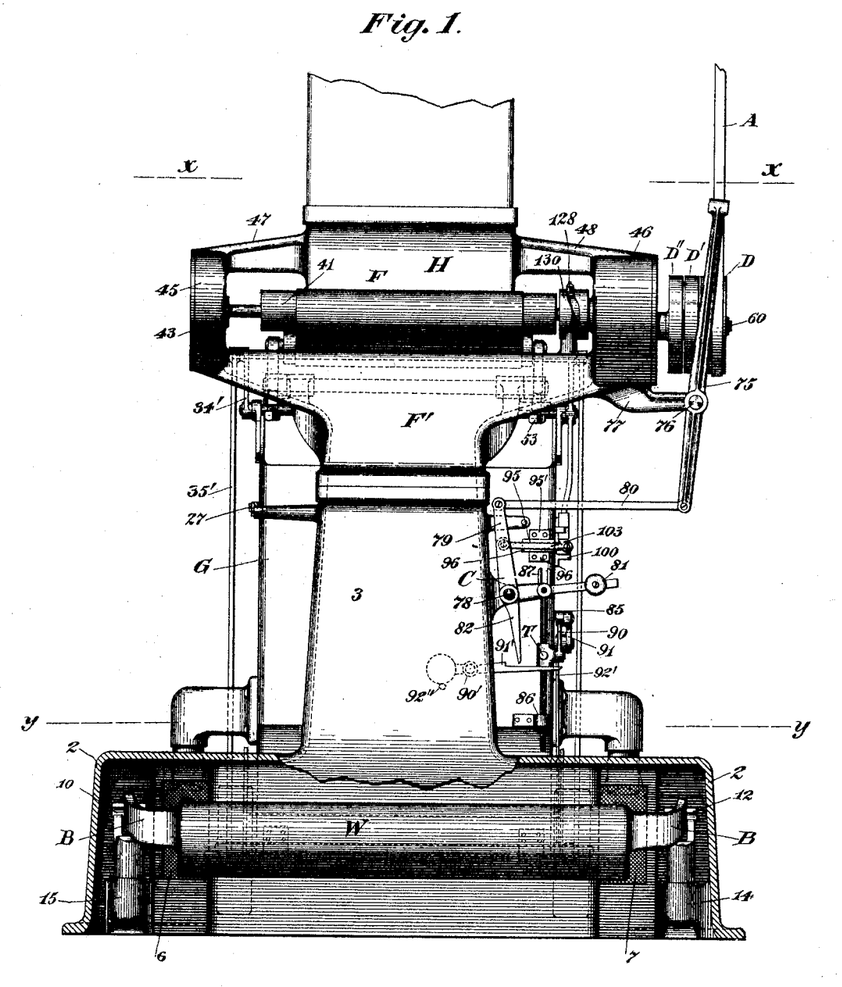
Figure 1 is a rear elevation of my improved weighing-machine, the base being in section.
Figure 2:
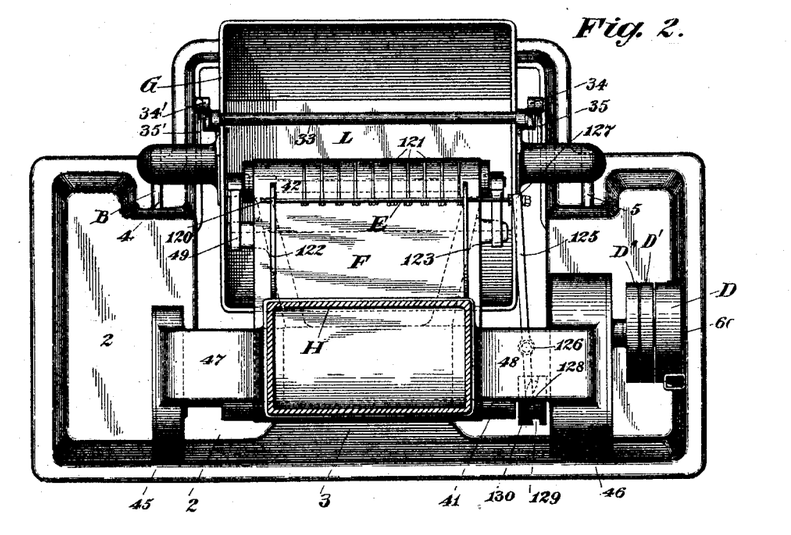
Fig. 2 is a sectional plan view, the section being taken in the line $x\ x$, Fig. 1.

The operation of the actuator C is controlled in the present case by the reciprocatory bar 85, slidable in the guide-bracket 86 on the load-receiver, it being forked or bifurcated at its upper end, as at 87, to receive the projection or pin 88 on the working arm of the actuator-lever C, and said controlling-bar 85 carries between its ends the block 89, to which the link 90 is pivoted, said link being also pivoted to the lever 91, fulcrumed, as at 92, upon the load-receiver. The lever 91 is connected with the closer by the link or rod 92', pivoted to these parts, the joint between said link and the closer being adjacent to the axis of the latter. At the commencement of operation, as shown in Fig. 1, the closer L being shut, the pin will be against the bottom of the bifurcation 87 and the driving-belt A will be on the pulley D, whereby the feeder F will be driven at its high speed to conduct the main supply into the load-receiver. When a predetermined portion of the load has been received, the load-receiver will descend and the controlling-bar will be carried therewith, thereby permitting the weight 81 to drop, and consequently thrusting the link 80 to the right, whereby the belt can be slipped to the pulley D', this operation being concluded at the commencement of the poising period, at which time the actuator-arm 82 will have struck the shoulder 91' of the detent 90', consisting of a weighted lever pivoted upon the column 3, and the weight of which rests upon the pin 92'', thereby arresting the further movement of the actuator C, and consequently of the belt-shipper 75.

Figures 6, 13, 14, 15:
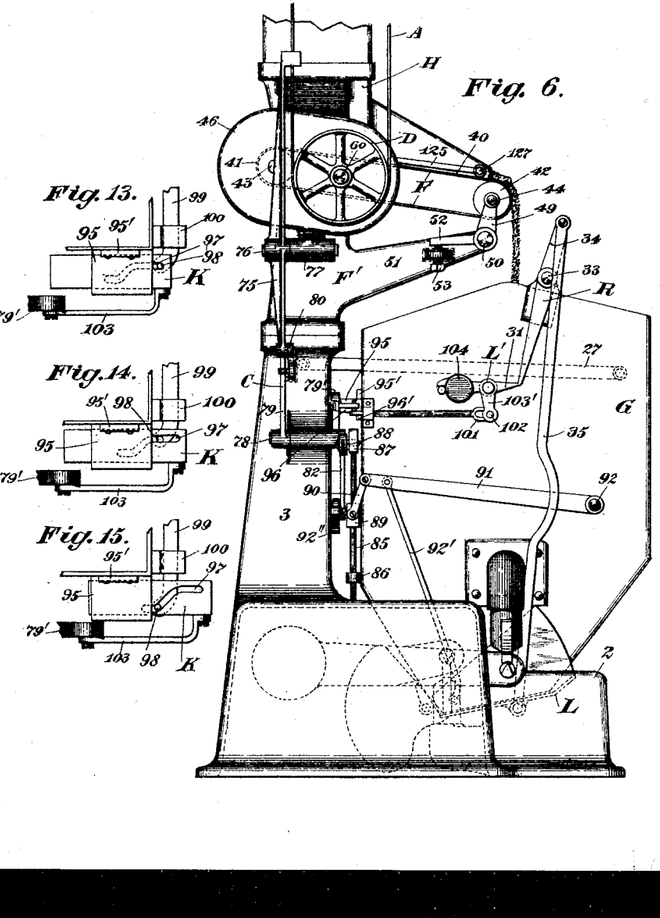
Fig. 6 is a side elevation as seen from the right in Fig. 5.
Figs. 13, 14, and 15 are detail views of a portion of the latch-tripping mechanism.
Figure 7:
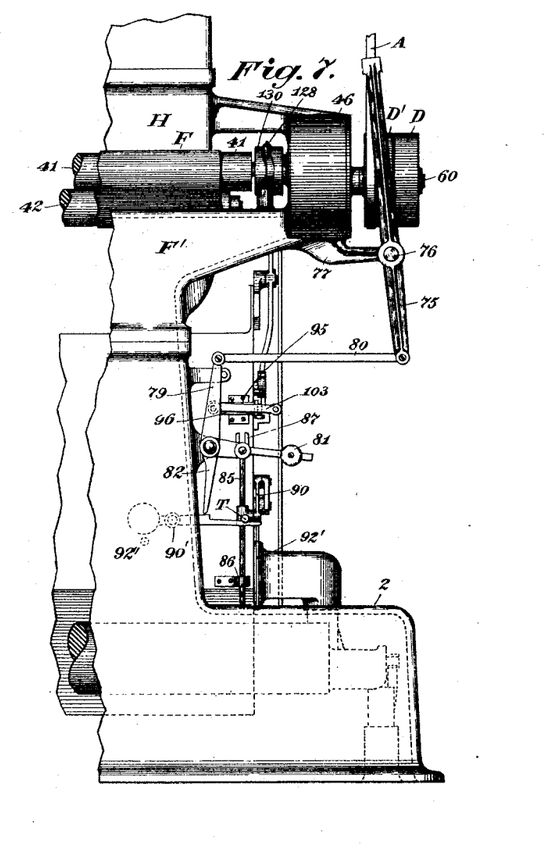
Fig. 7 is a similar view to Fig. 5, showing the parts in the positions occupied thereby on the stoppage of the supply-stream.
Figure 8:
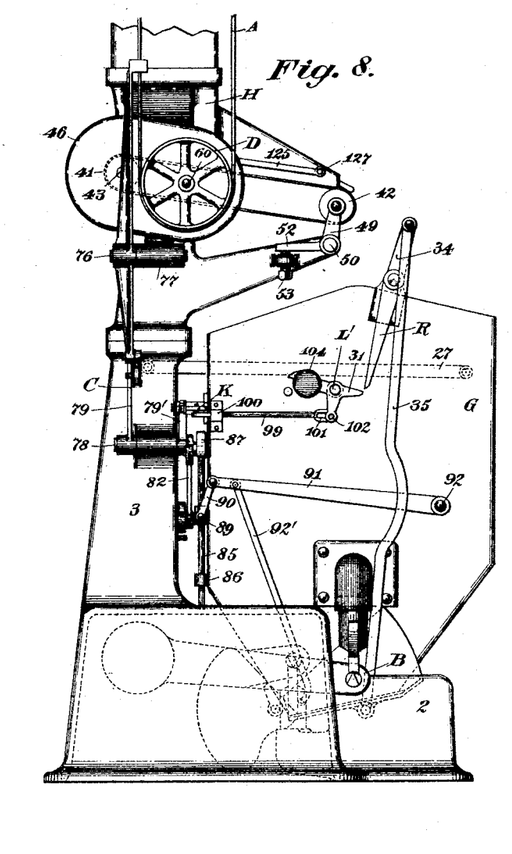
Fig. 8 is a side elevation as seen from the right in Fig. 7.
Figure 9:
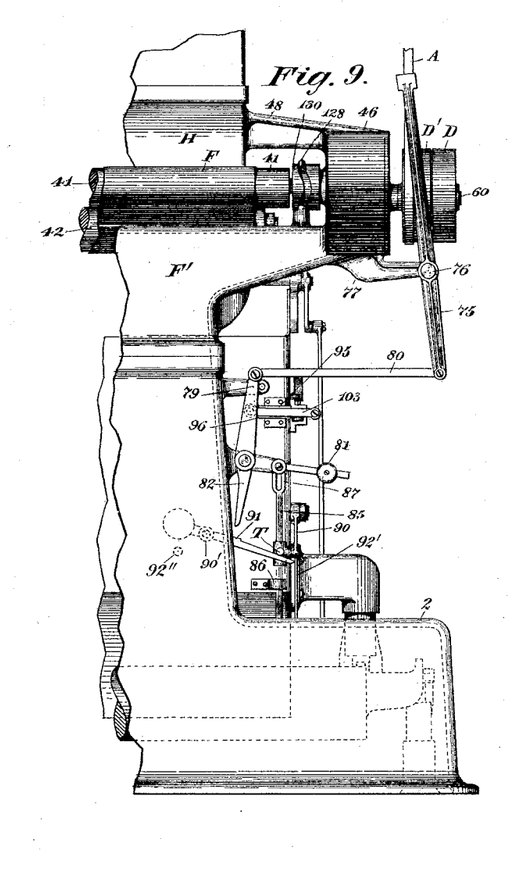
Fig. 9 is a view similar to Figs. 5 and 7, showing the positions occupied by the parts during the discharge of a load.
Figure 10:
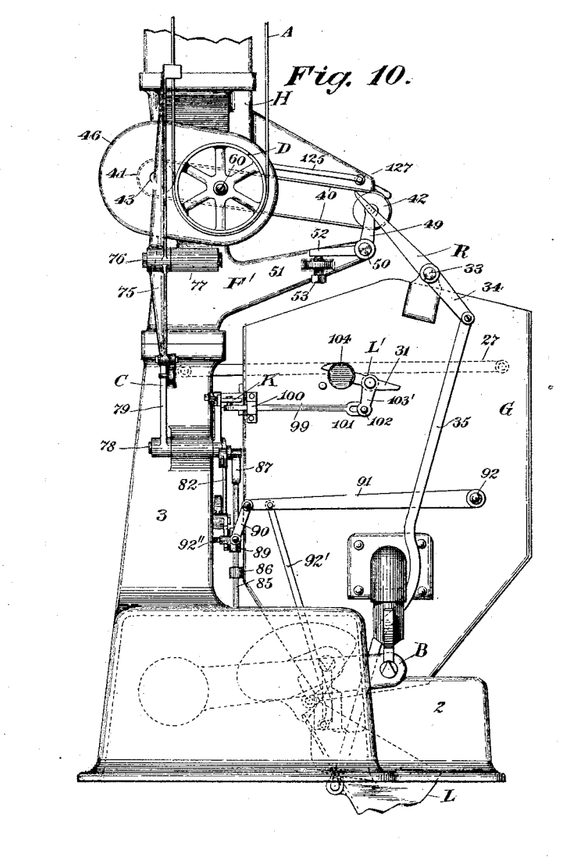
Fig. 10 is a side elevation as seen from the right in Fig. 9.

When the driving-belt is on the pulley D', the feeder F will be driven at a slow speed, so that a drip or reduced stream is caused to enter the load-receiver, as indicated in Fig. 6. Upon the completion of the load the load-receiver will pass below the so-called "poising-line," and the tripper T on the block 89 will be carried against the free end of the detent 90, thereby disengaging the same from the arm 82, as shown in Fig. 9, whereby the weight 81 can drop to ship the belt A to the idle or loose pulley D'', (see Fig. 9,) and during this stage the latch L', governing the discharge of the load, is tripped by power derived from the actuator C, thereby releasing the closer L, which is forced open, as shown in Fig. 10. When the closer opens, the rod 85 is drawn downward sufficiently far to prevent the actuator C being returned to its primary position as the emptying load-receiver rises. When the closer shuts, an upward thrust is applied to the link 92', thereby elevating the rod 85, and consequently the working or weighted arm of the actuator C, so that the belt-shipper 75 is returned to its primary position, which shifts the belt A from the idle-pulley D'' to the outer pulley D.

The latch L' is tripped by a cam connected, preferably, with the belt-shipper actuator C and with the latch L' and preferably mounted for reciprocation upon the load-receiver. The cam for operating the latch is designated by K, and it is supported for sliding movement between the plates 95 and 96, flanged, as at 95' and 96', the flanges being secured to the load-receiver and a sufficient space being left between the two plates to permit the free movement of the tripper-cam. Said cam has a longitudinal irregular slot 97, adapted to receive the stud 98 on the rod 99, reciprocative in a plane transverse to the cam K (see Figs. 13 to 15) and slidably supported by the bracket 100, fixed to the load-receiver and provided at its opposite end with the loop 101, embracing the pin 102 on the depending arm of the closer-latch L', which is held in engagement with the rocker R by the weight 104. The cam K is connected with the rock-arm 79' by the intervening link 103, pivoted, respectively, to these members, and the disposition and construction of the several parts are such that on the working stroke of the cam K in one direction the latch L' will be tripped or disengaged from the rocker R, and on the opposite movement thereof said latch will be returned to its primary position to engage the rocker. At the commencement of operation the pin 98 will be at the end of the cam-slot 97, as shown in Fig. 13, and when the arm 79 moves in the manner aforesaid the link 103 will be thrust to the right until the pin 98 is substantially at the curved portion of the slot, the belt A at this time being on the pulley D', whereby the feeder F will be driven at its low speed to conduct the drip-supply into the nearly-loaded receiver G. On the completion of the load the actuator C is released, the weight 81 thereby dropping and rapidly thrusting the link 103, and consequently the cam K, to the right, so that the pin 98 is caused to enter the curved portion of the slot to move the rod 99 from the position shown in Fig. 6 to that represented in Fig. 10, so that the latch L' can be disengaged from the rocker R to release the closer. On the shutting of the closer in the manner aforesaid the operation is reversed.

To insure the free feed of the supply-stream, I mount near the discharge edge of the feed device F a shaker, as E, consisting of a longitudinal carrier, as 120, and a series of projecting fingers 121, projecting therefrom and adapted to come into contact with the material supported upon the upper side of the feed device, and the carrier is supported in suitable bearings in the arms 122 and 123, respectively, extending forward from the hopper, and is adapted to reciprocate in a direction transversely to the line of feed of the supply-stream. The shaker E may be reciprocated as follows: A longitudinal rod is shown at 125, pivoted, as at 126, upon the framework of the machine, one end thereof being jointed, as 127, to the shaker E, while the other end is provided with a projection 128, adapted to enter the irregular groove 129 on the cam 130, fixed to the secondary driving-shaft 43.

The operation of the hereinbefore-described machine is as follows: In Figs. 1 and 4 the parts are represented occupying their primary positions, the closer L being shut and held by the latch L' in engagement with the rocker R and the belt A being on the driving-pulley D, whereby the feeder F is operated at its fast speed to conduct the full volume of the supply into the empty load-receiver, and when a predetermined portion of the load has been received the load-receiver will descend, the bifurcated bar 85 moving therewith and permitting the weight 81 of the actuator C to fall, thereby slipping the belt A toward and upon the pulley D' at the commencement of the poising period, whereby the feeder F is driven at its low speed to convey the drip-supply into the nearly-loaded receiver. On the completion of the load the load-receiver descends to its full limit, the tripper T thereby striking the latch 90 and releasing the actuator C, whereby it serves to ship the belt A to the idle-pulley D'', and at the same time the latch L' is tripped in the manner aforesaid to release the closer, which is then forced open by the weight of the load. On the discharge of the load the closer is shut and the parts are thereby returned to their initial positions to repeat the operation.

Having described my invention, I claim—

1. The combination, with a chambered base having openings, of flexible diaphragms covering said opening; a beam mounted in the base and having arms extending through slots in the diaphragms, and provided with offsets; means in the base upon which the offsets are mounted; and a load-receiver supported upon the extended ends of the beam-arms.

2. The combination, with a chambered base having an opening, of a flexible diaphragm covering said opening; a scale-beam located in the base and extending through an opening in said diaphragm, the scale-beam being supported at a point in line with the place at which the beam extends through the diaphragm; and a load-receiver mounted upon the beam.

3. The combination, with a chambered base having openings, of flexible diaphragms covering said openings; a beam in the base, consisting of a pair of arms extending through slots in the diaphragms, and a weight joining said arms; and a load-receiver supported by the extended portions of the arms.

4. The combination, with weighing mechanism involving a load-discharger, of a supply apparatus including a feeder; driving mechanism for the feeder, embodying a pair of drivers; a driving device adapted to be thrown into operative connection with the two drivers alternately; a shipper for said driving device; an actuator for the shipper, having two successive stages of action; a rod connected by linkage with the load-discharger for controlling the operation of the actuator during its first stage of action; and an independent detent mounted on the framework for intercepting the movement of said actuator at the close of its first stage of action.

5. The combination, with weighing mechanism involving a load-discharger, of a supply apparatus including a feeder; driving mechanism for the feeder, embodying a pair of drivers; a driving device adapted to be thrown into operative connection with the two drivers alternately; a shipper for said driving device; an actuator for the shipper, having two successive stages of action; a rod connected by linkage with the load-discharger for controlling the operation of the actuator during its first stage of action; an independent detent mounted on the framework for intercepting the movement of said actuator at the close of its first stage of action; and means operative with the load-discharger for tripping said detent.

6. The combination, with weighing mechanism involving a load-receiver provided with a closer, of means including a latch for governing the operation of said closer; a supply-feeder; driving mechanism for said feeder, embodying a pair of drivers; a driving device adapted to be thrown into operative connection with the two drivers alternately; a shipper for said driving device; an actuator for the shipper, having two successive stages of action; a rod connected by linkage with the closer for controlling the operation of the actuator during the first stage of its action; a detent for intercepting the movement of said actuator at the close of its first stage of action; means for tripping the detent; and means operative with said closer for simultaneously tripping said detent and latch.

7. The combination, with weighing mechanism involving a load-discharger, of a supply apparatus including a feeder; driving mechanism for the feeder, embodying a pair of drivers; a driving device adapted to be thrown into operative connection with the two drivers alternately; a shipper for said driving device; an actuator for the shipper, having two successive stages of action; a rod connected by linkage with the load-discharger for controlling the operation of the actuator during the first stage of its action; a detent for intercepting the movement of said actuator at the close of its first stage of action; means including a latch for governing the discharge of a load; and means for simultaneously tripping said detent and latch.

8. The combination, with weighing mechanism involving a load-receiver provided with a closer, of means including a latch for governing the operation of said closer; a supply-feeder; driving mechanism for said feeder, embodying a pair of drivers; a driving device adapted to be thrown into operative connection with the two drivers alternately; a shipper for said driving device; a counterweighted actuator for the shipper, mounted upon the framework and having two successive stages of action; a rod connected by linkage with the closer for controlling the operation of the actuator during the first stage of action; a counterweighted detent pivoted upon the framework for intercepting the movement of said actuator at the close of its first stage of action; and means for tripping said detent.

9. The combination, with weighing mechanism involving a load-discharger, of a supply apparatus including a feeder; driving mechanism for the feeder, embodying a pair of drivers; a driving device adapted to be thrown into operative connection with the two drivers alternately; a shipper for said driving device; an actuator for the shipper, having two successive stages of action; a rod connected by linkage with the load-discharger for controlling the operation of the actuator during the first stage of its action; a detent for intercepting the movement of said actuator at the close of its first stage of action; means including a latch for governing the discharge of a load; means for tripping said detent; a cam coöperative with and constructed to trip said latch; and means operated by said shipper-actuator for actuating the cam.

10. The combination, with weighing mechanism involving a load-discharger, of a supply apparatus including a feeder; driving mechanism for the feeder, embodying a pair of drivers; a driving device adapted to be thrown into operative connection with the two drivers alternately; a shipper for said driving device; an actuator for the shipper, having two successive stages of action; a reciprocative rod in position to be operated by the load-discharger and adapted for controlling the operation of the actuator during its first stage of action; a detent for intercepting the movement of said actuator at the close of its first stage of action, and said rod having a movement independent of the actuator during the second stage of action of the latter; and means for tripping said detent on the completion of a load.

11. The combination, with weighing mechanism involving a load-receiver having a closer, of a supply apparatus including a feeder; driving mechanism for the feeder, involving a pair of drivers; a driving device adapted to be thrown into operative connection with the two drivers alternately; a shipper for said driving device; an actuator for the shipper; a lever mounted on the load-receiver and connected with the closer; and a controlling-bar coöperative with the actuator and connected with said lever.

12. The combination, with weighing mechanism involving a load-receiver provided with a closer, of a supply apparatus including a feeder; driving mechanism for the feeder, including a pair of drivers; a driving device adapted to be thrown into operative connection with the two drivers alternately; a shipper for said driving device; an actuator for the shipper; a lever mounted on the load-receiver; a link connecting the lever and the closer; a controlling-bar for the actuator, mounted for reciprocation; and a link connecting said lever and bar.

13. The combination, with weighing mechanism involving a load-discharger, of a supply apparatus including a feeder; driving mechanism for the feeder, involving a pair of drivers; a driving device adapted to be thrown into operative connection with the two drivers alternately; a shipper for said driving device; an actuator for the shipper; a controlling device for the actuator, connected with the load-discharger; a detent in position to hold the actuator at a predetermined point; and means on such controlling device for tripping the detent.

14. The combination, with weighing mechanism involving a load-discharger, of a supply apparatus including a feeder; driving mechanism for the feeder, involving a pair of drivers; a driving device adapted to be thrown into operative connection with the two drivers alternately; a shipper for said driving device; an actuator for the shipper; means including a latch for controlling the discharge of a load; and means connected with said actuator for tripping the latch.

15. The combination, with weighing mechanism involving a load-receiver, of a supply apparatus including a feeder; driving mechanism for the feeder, involving a pair of drivers; a driving device adapted to be thrown into operative connection with the two drivers alternately; a shipper for said driving device; a counterweighted actuator for the shipper, mounted on the framework; a vertically-reciprocative controlling-bar coöperative with said actuator and connected with the load-discharger and mounted for vertical reciprocation upon the weighing mechanism; a detent mounted upon the framework in position to intercept the actuator at a predetermined point; and a tripper for said detent, on the controlling-bar.

16. The combination, with a load-receiver, of a closer mounted upon the load-receiver and controlling the discharge of material therefrom; a cam mounted for reciprocation upon the load-receiver and having an irregular slot; a latch controlling the operation of said closer; a bar connected with the latch and having a pin disposed in said slot; and means for operating the cam.

17. The combination, with weighing mechanism including a load-receiver provided with a closer, of means including a latch for controlling the operation of the closer; a cam coöperative with and constructed to trip said latch and mounted upon the load-receiver for reciprocation in a direction transverse to the plane of ascending and descending movement of said load-receiver; and means for actuating said cam.

18. The combination, with weighing mechanism including a load-receiver and with load-discharging means including a latch, of a cam mounted for sliding movement upon the load-receiver and having a slot; a rod connected with the latch and provided with a pin located in said slot; and means operative with the weighing mechanism for actuating said cam.

19. The combination, with weighing mechanism and with load-discharging-controlling means including a latch having an arm provided with a pin, of a cam mounted on the load-receiver and having a slot; a rod having a loop at one end to receive the pin on the latch, and provided at its opposite end with a projection entering the slot of the cam; and means operative with the weighing mechanism for actuating said cam.

20. The combination, with weighing mechanism involving a load-receiver, of primary and secondary shafts connected with each other and provided, respectively, with sleeves loose thereon; a feed device operated by one of said shafts; a series of gears upon the shafts, certain of which are fixed to the sleeves, and one of which is loose on the primary shaft; a device mounted on said loose gear; a coöperating member fixed to the primary shaft, and means controlled by the weighing mechanism for throwing said drivers into and out of action alternately.

21. The combination, with weighing mechanism involving a load-receiver, of primary and secondary shafts connected with each other and provided, respectively, with sleeves loose thereon; a feed device operated by one of the shafts; a series of meshing gears certain of which are fixed to the sleeves, and one of which is loose on the primary shaft; a pawl carried by said loose gear; a coöperating ratchet fixed to the primary shaft; a series of drivers fixed, respectively, to the primary shaft and to the sleeve thereon; and means controlled by the weighing mechanism for throwing said drivers into and out of action alternately.

FRANCIS H. RICHARDS.

Witnesses:
F. N. CHASE,
JOHN O. SEIFERT.